Figure 1:
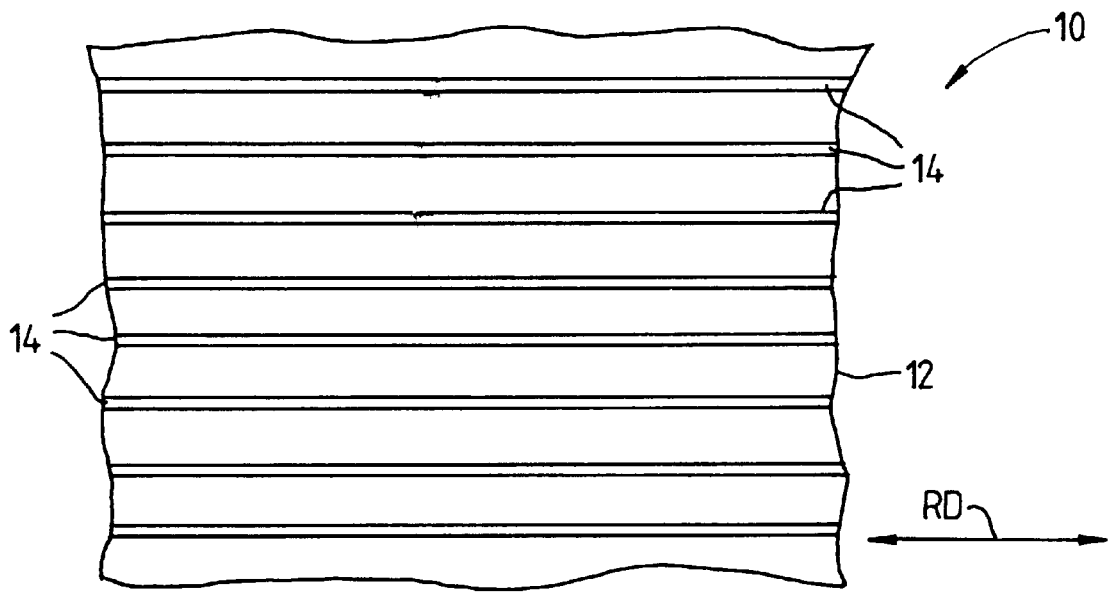

United States Patent [19]
Bradshaw et al.

[11] Patent Number: 6,118,510
[45] Date of Patent: Sep. 12, 2000

[54] LIQUID CRYSTAL DEVICE

[75] Inventors: Madeline Joan Bradshaw, Upleadon; John Clifford Jones, Malvern; Ian Charles Sage, Malvern; Damien Gerard McDonnell, Malvern Link; Paul Anthony Gass, Blackstock Close, all of United Kingdom

[73] Assignees: Sharp Kabushiki Kaisha, Osaka, Japan; The Secretary of State for Defence in Her Britannic Majesty's Government of the United Kingdom of Great Britain and Northern Ireland, Hants, United Kingdom

[21] Appl. No.: 09/438,163

[22] Filed: Nov. 11, 1999

Related U.S. Application Data

[63] Continuation of application No. 08/899,440, Jul. 24, 1997.

[30] Foreign Application Priority Data

Jul. 26, 1996 [GB] United Kingdom ............. 9615778

[51] Int. Cl.[7] .................................................. G02F 1/1339
[52] U.S. Cl. .......................................... 349/156; 349/187
[58] Field of Search ................................... 349/187, 189, 349/155, 156, 157

[56] References Cited

U.S. PATENT DOCUMENTS

| | | |
|---|---|---|
| 4,295,712 | 10/1981 | Ishiwatari . |
| 4,389,095 | 6/1983 | Teshima et al. . |
| 4,639,089 | 1/1987 | Okada et al. . |
| 4,653,864 | 3/1987 | Baron et al. . |
| 4,720,173 | 1/1988 | Okada et al. . |
| 4,744,639 | 5/1988 | Tsuboyama . |
| 4,763,995 | 8/1988 | Katagiri et al. . |
| 5,545,280 | 8/1996 | Wenz . |
| 5,629,787 | 5/1997 | Tsubota et al. .................. 349/153 |
| 5,644,371 | 7/1997 | Koden et al. . |
| 5,777,713 | 7/1998 | Kimura . |
| 5,838,414 | 11/1998 | Lee . |

FOREIGN PATENT DOCUMENTS

| | | |
|---|---|---|
| 0209112 | 1/1987 | European Pat. Off. . |
| 0580132 | 1/1994 | European Pat. Off. . |
| 0635749 | 1/1995 | European Pat. Off. . |
| 0651278 | 5/1995 | European Pat. Off. . |
| 0782037 | 7/1997 | European Pat. Off. . |
| 60-121418 | 6/1985 | Japan . |
| 6308500 | 11/1994 | Japan . |
| 06331970 | 12/1994 | Japan . |
| 8-36169 | 2/1996 | Japan . |
| 1434509 | 5/1976 | United Kingdom . |
| 8605283 | 9/1986 | WIPO . |
| 9314437 | 7/1993 | WIPO . |

OTHER PUBLICATIONS

R. P. Wenz, et al.; SID 93 Digest; pp. 961–964; "Plastic Microstructure–Spaced LCD".

*Primary Examiner*—James A. Dudek
*Attorney, Agent, or Firm*—Renner, Otto, Boisselle & Sklar

[57] ABSTRACT

A liquid crystal device is provided with a pair of substrates (12, 16) containing a liquid crystal material (22). A wall structure comprising, for example, a plurality of walls (14) is provided between the two substrates. The wall structure provides mechanical strength to the device and resistance to flow of liquid crystal material which can cause deterioration in the device performance. The walls may extend in two mutually different directions (FIG. 8, 40) to provide mechanical strength and resistance to flow in two directions while the device can still be readily filled. The device is particularly applicable to a ferroelectric liquid crystal device.

5 Claims, 5 Drawing Sheets

LIQUID CRYSTAL DEVICE

This appllication is a divisional of Ser. No. 08/899,440 filed Jul. 24, 1997.

The present invention relates to a liquid crystal device comprising a plurality of liquid crystal pixels. The invention has particular, but not exclusive, application to a large area ferroelectric liquid crystal display device which device is resistant to mechanical stresses. The invention is equally applicable to liquid crystal shutter devices for use in printers and projection display systems, for example. The invention further relates to a method of making a liquid crystal device having resistance to mechanical stresses.

Liquid crystal devices, particularly large area liquid crystal devices, are known to be susceptible to mechanical stress. Even if no damage is caused to the mechanical components of the liquid crystal device by the application of stress, its performance can still be severely degraded. In the case of a ferroelectric liquid crystal device (FLCD) such mechanical stresses can cause flow of the liquid crystal material within the device. Such flow can result in deterioration of the alignment of the liquid crystal molecules or even a change of state of the molecules (for instance from smectic phase alignment state C1 to smectic phase alignment state C2).

It is an object of the present invention to provide a liquid crystal device having improved resistance to mechanical stress.

According to a first aspect of the present invention, there is provided a liquid crystal device comprising a liquid crystal material contained between two substrates, the substrates carrying electrode structures for addressing a plurality of liquid crystal cells, and a wall structure extending between the two substrates for restricting flow of the liquid crystal material in at least one direction substantially perpendicular to a plane of the substrates.

According to a second aspect of the present invention there is provided a method of filling a liquid crystal device as claimed in claim 1, wherein a second substrate is spaced apart from a wall structure mounted on a first substrate, liquid crystal material is introduced into a plurality of cavities defined by the wall structure and the second substrate is brought into proximity of the wall structure.

By providing a wall structure within the liquid crystal device the liquid crystal material is restrained in its movement. Thus, the liquid crystal material cannot flow freely within the device.

The wall structure may comprise a plurality of walls which extend between the two substrates of the device. When these walls are straight and substantially parallel to one another the flow of the liquid crystal material will be restricted in one direction only.

The present invention can also provide resistance to shear. Shear occurs when the two substrates of the device move relative to one another. Shear can result in mechanical damage and it is therefore desirable to avoid it.

The performance of a liquid crystal device in accordance with the present invention may be enhanced by further restricting the flow and shear of liquid crystal material in a further direction which is also substantially perpendicular to the plane of the substrates.

One means for providing this further restriction is by providing for the wall structure to comprise a grid-like wall structure. The wall structure would appear similar to the shape of a waffle and would isolate the liquid crystal material within the device into areas of one pixel or a small number of pixels. However, one disadvantage of such an arrangement is that the device may be difficult to fill with liquid crystal material in manufacture. Generally, during manufacturing an FLCD will be filled by liquid crystal in the nematic phase. The device is then cooled using a controlled temperature profile to end up in the smectic C* phase. The speed of filling is important to efficient manufacture. One solution to this problem is to fill the liquid crystal device while it comprises only a first substrate and the wall structure, in other words prior to the fitting of the second substrate. Another solution is to assemble the device with the second substrate arranged in close proximity to the wall structure but leaving sufficient space for the filling of the device. This may be arranged by separating the two substrates using breakable members, for example glass beads, which are then broken after the liquid crystal is introduced. These two solutions, however, may still result in a slow filling step during manufacture and may also result in waste of liquid crystal material.

An alternative to the grid-like structure is to provide a more open layout which is capable of being filled more readily while still providing substantial restriction to flow and shear of liquid crystal material in use. One solution is to provide a plurality of non-linear walls between the transparent substrates of the device. The device can then be filled readily in the standard manner into the sub-sections defined by the walls. The walls are sufficiently closely spaced and have sufficiently long individual sections to restrict the flow and shear of the liquid crystal material in two orthogonal directions. Such walls may describe a number of different shapes. For example, triangular waves, square waves, sinusoidal waves and so on. Such walls may be arranged substantially parallel to one another or alternate walls may be arranged in a reversed manner so that any one sub-section of the device is an alternation of narrow and broad areas. When the walls are arranged in such a reversed manner the flow of liquid crystal material is restricted substantially by a bottle-neck effect.

Alternatively a pattern of shorter partitions may be provided to effect restriction on flow of the liquid crystal material. One such arrangement of walls may comprise a pair of orthogonal and inter-linked square waves. Only those portions of each square wave in one particular direction are provided so that the two patterns may be interlocked.

Since the material from which the wall structure is constructed does not generally alter with the voltage applied it is important to ensure that the presence of the wall structure is not discernible to a user of the device. Accordingly, the wall structure is preferably arranged to lie between the liquid crystal pixels of the device. The spacing of the elements of the wall structure may be as close as one of the pixels dimensions or further apart to facilitate filling of the device during manufacture and reduce the effects of any edge defects in the liquid crystal material caused by the wall structure. A spacing of 500 $\mu$m or less has been found to be effective while a spacing of 200 $\mu$m or less provides even better restriction of liquid crystal flow and shear with consequent improvement in the mechanical stability of the device. The mechanical stability of the device will be enhanced by use of walls which are thick in cross section but if the thickness of the walls is too great then there will be a detrimental effect on the optical performance of the device. A thickness of less than 15 $\mu$m has been found to be an effective compromise, while a thickness of 3 $\mu$m provides adequate mechanical stability while causing no interference to pixels of the device.

Such wall structures may conveniently be manufactured by spinning down a layer of, for example, polyimide upon a first of the device substrates to the intended thickness of the cell. The second of the device substrates is then secured on the other side of the wall structure. However, this may allow a small amount of liquid crystal flow and shear between the wall structure and the surface of the second substrate. Accordingly, a wall structure may be further provided on the second substrate of the device which structure will cooperate with that on the first substrate. For example, a wall may be provided on the first substrate extending almost over the thickness of the device and mate between a pair of shorter walls provided on the second substrate. Alternatively, a single, taller wall may be provided on the second substrate for each wall on the first substrate. The relative placement of these walls may be alternated across the device in order to prevent movement of the second substrate relative to the first substrate, that may result in shear.

The present invention is particularly applicable to large area FLCDs because these devices are especially sensitive to mechanical stress. During manufacture the alignment of the directors (in other words the molecules) of the liquid crystal and the arrangement of the layers are controlled by temperature. This thermal history is particularly important for the devices optical performance. If the device is subject to mechanical stress, this can result in plastic deformation which damages the careful arrangement of the molecules. Once these have been damaged, they are unlikely to return to their original alignment.

Furthermore, because a ferroelectric liquid crystal device which uses the smectic C phase of the liquid crystal must have a very thin liquid crystal layer (typically between 1 and 2 $\mu$m) it is especially sensitive to mechanical stress.

Further preferred features of the invention are identified in the appended dependent claims.

Figure 2:
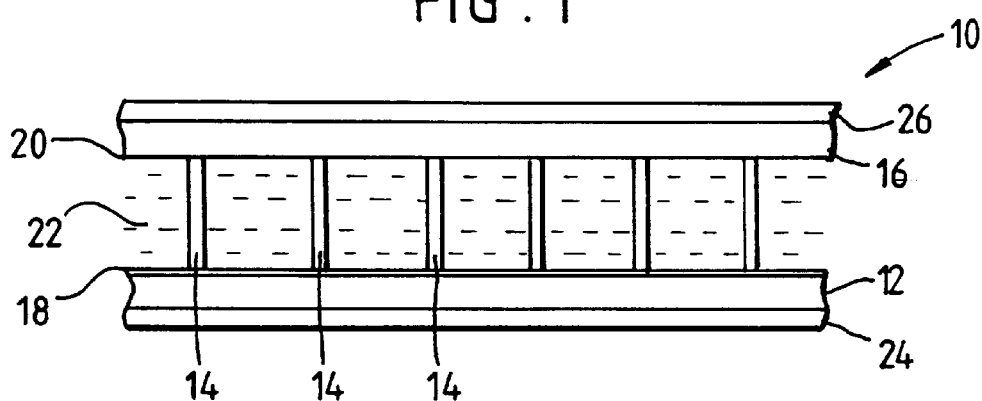
Figure 3:
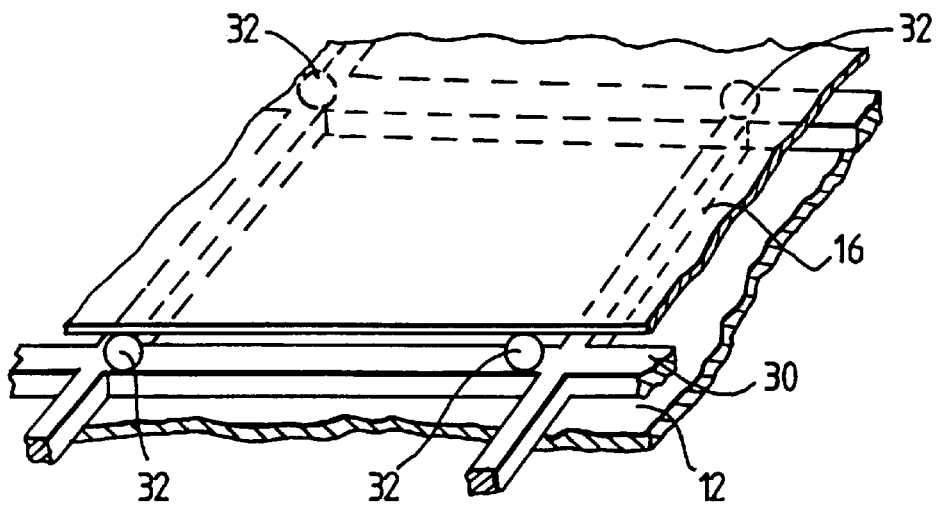
Figure 4:
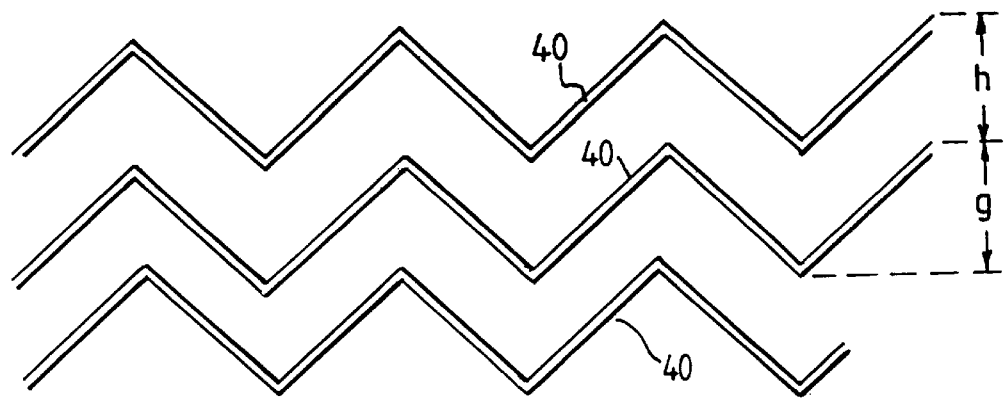
Figure 5:
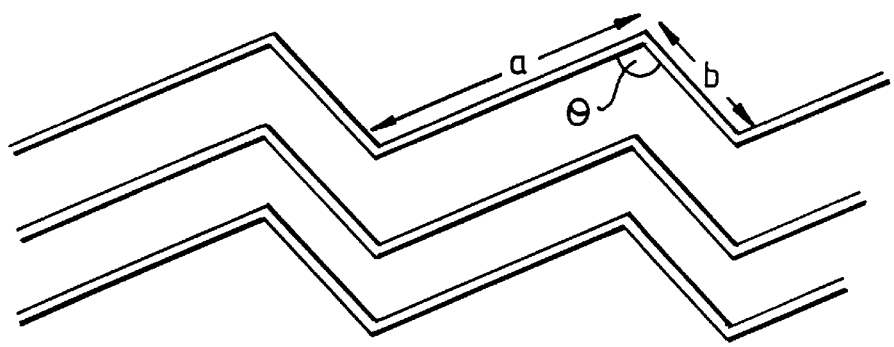
Figure 6:
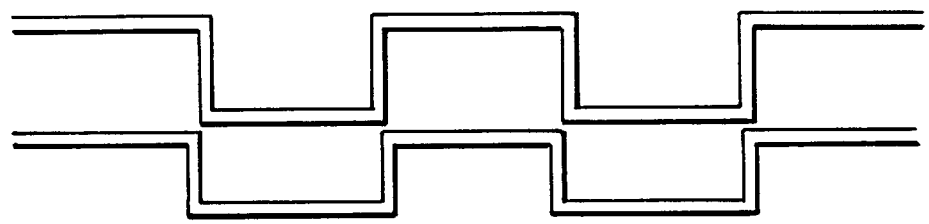
Figure 7:
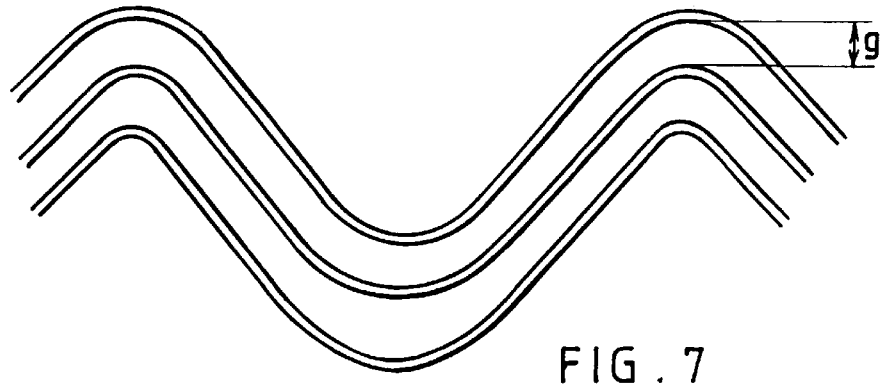
Figure 8:
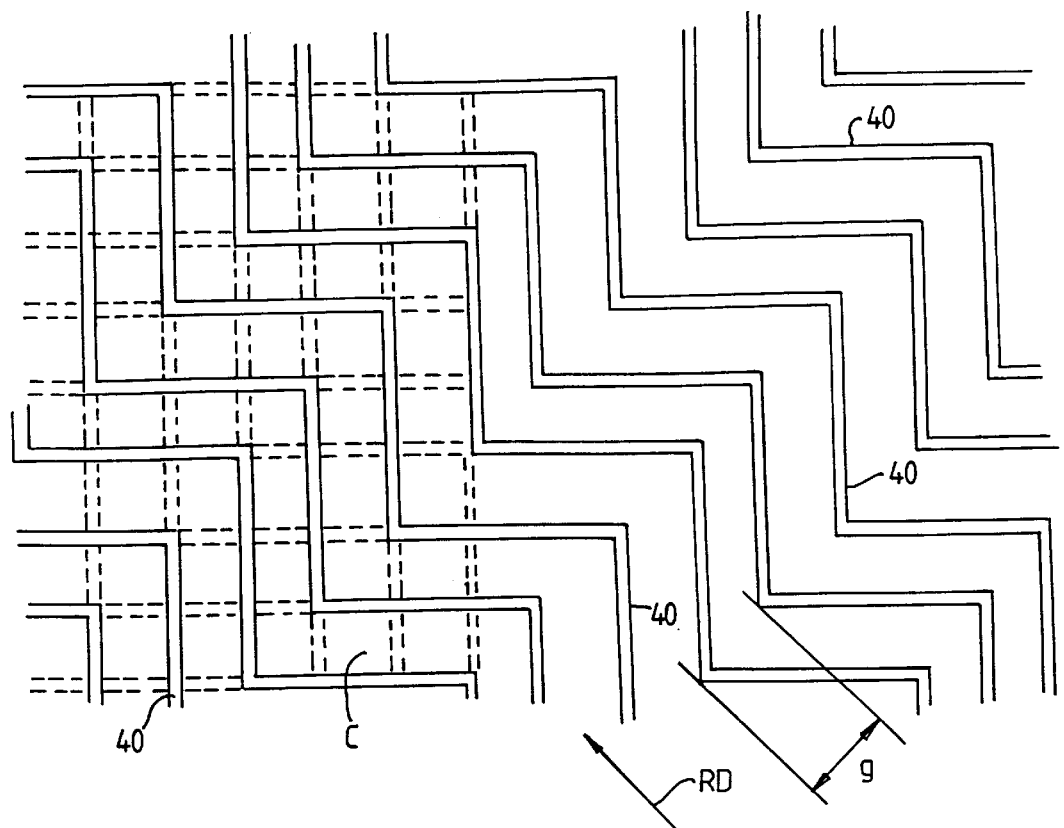
Figure 9:
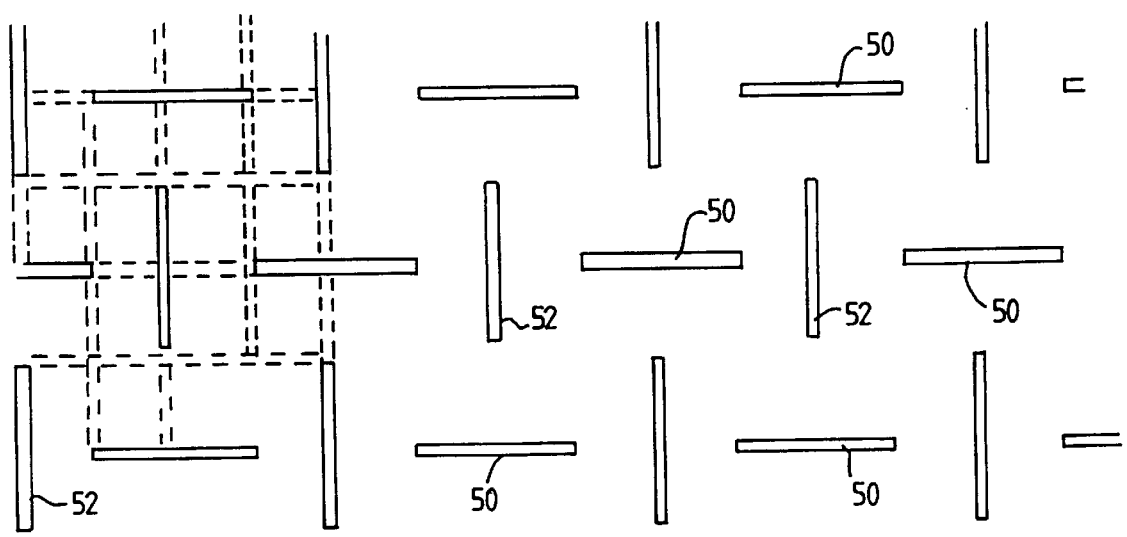
Figure 10:
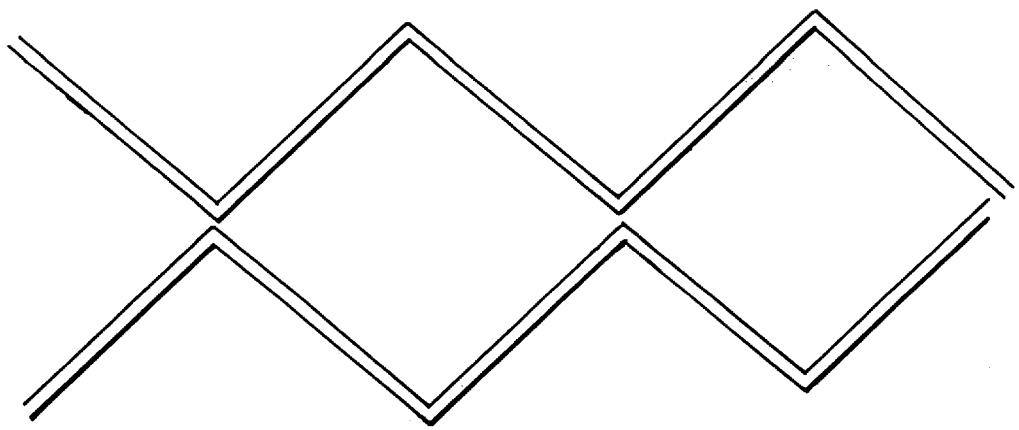
Figure 11:
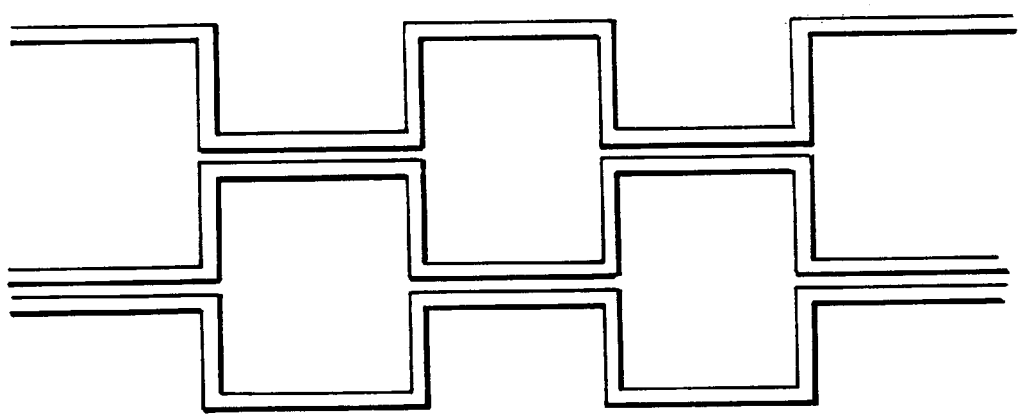
Figure 12:
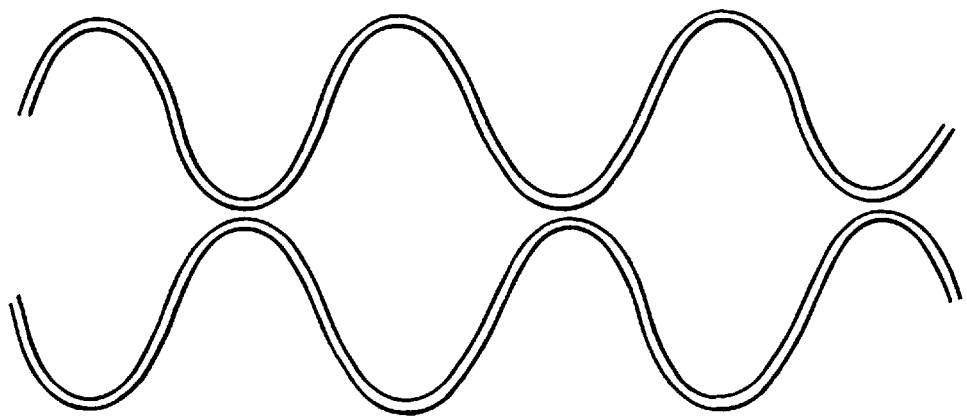
Figure 13:
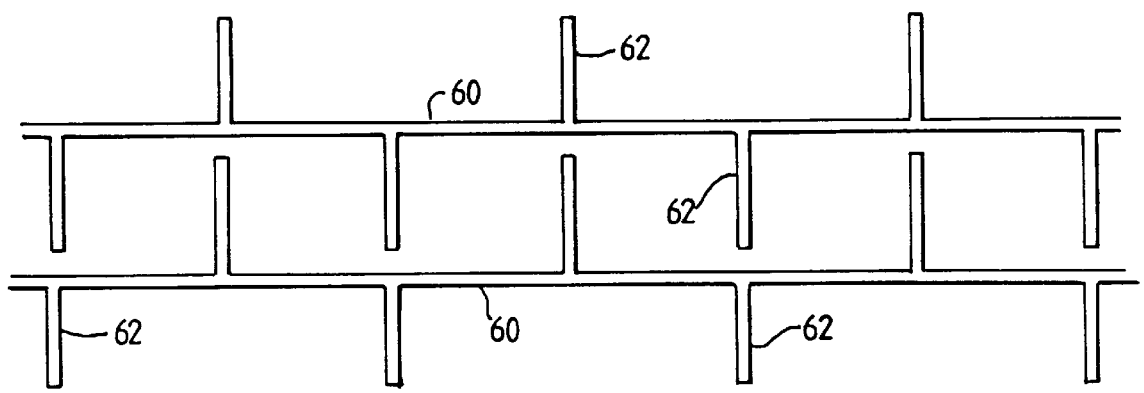
Figure 14:
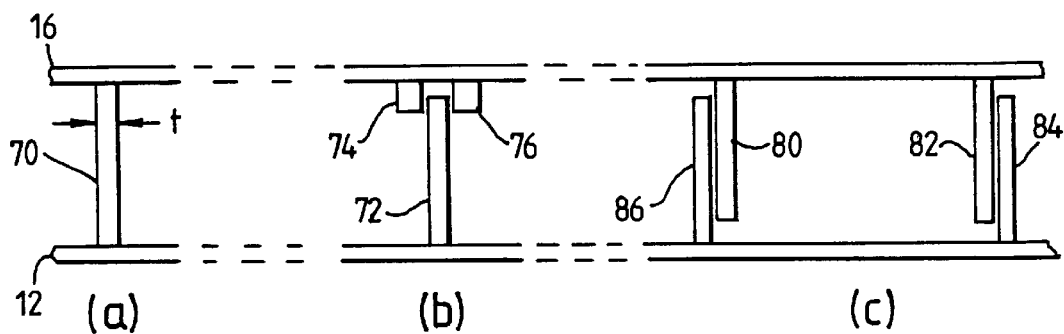
Figure 15:
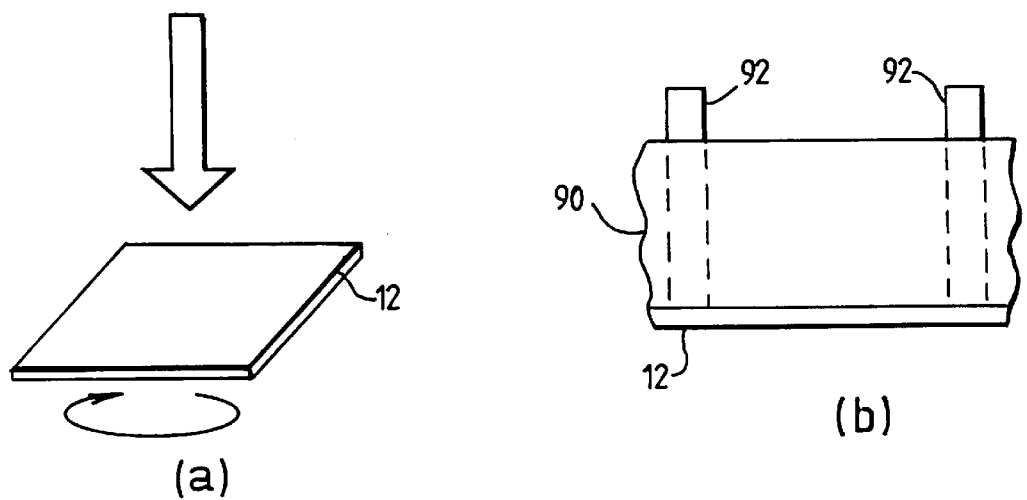

The present invention will now be described, by way of example, with reference to the accompanying drawings, in which:

FIG. 1 shows a plan view of a part of a liquid crystal device in accordance with the present invention, FIG. 2 shows an elevational section of part of a liquid crystal device in accordance with the invention, FIG. 3 shows a perspective view of a portion of a different liquid crystal device in accordance with the invention, FIG. 4 shows a plan view of a wall structure in accordance with another embodiment of the invention, FIG. 5 shows a plan view of a wall structure which is a generalized version of that shown in FIG. 4, FIG. 6 shows a plan view of a wall structure according to the invention which is based on a square wave shape, FIG. 7 shows a plan view of a further wall structure in accordance with the invention, FIG. 8 shows a plan view of the wall structure shown in FIG. 4 also showing the pixel layout and rubbing direction for the device, FIG. 9 shows an alternative wall structure in accordance with the invention, FIGS. 10 to 12 show plan views of three further wall structures in accordance with the invention, FIG. 13 shows a plan view of a still further wall structure in accordance with the invention, FIG. 14 shows an elevational view of three wall structures in accordance with the invention, and FIG. 15 shows a perspective view of two steps in the manufacturing process according to the present invention.

FIG. 1 shows a plan view of a part of a first substrate 12 of a large area ferroelectric liquid crystal display device. Arranged on a first face of the substrate 12 are a plurality of parallel walls 14. The walls comprise, for example, a polyimide material which is provided as described subsequently. The substrate 12 is covered with a rubbed polyimide layer as is known in the art of FLCDs. The rubbing direction of the polyimide layer is parallel to the walls 14 and is shown by a double-headed arrow RD.

The device 10 shown in a sectional, elevational view in FIG. 2. In this figure the first substrate 12 and a second substrate 16 contain a liquid crystal material 22. The substrate 12 is provided with an electrode structure 18 and the substrate 16 is provided with an electrode structure 20. For a large area array device these electrode structures will define a matrix of liquid crystal pixels. The device 10 is further provided with a first polarizer 24 and a second polarizer 26. The plurality of walls 14 extend between the substrate 12 and the substrate 16 thus restricting the movement of the liquid crystal material in a direction which is left-right in the drawing. As well as causing restriction of the flow of the liquid crystal material the plurality of walls 14 may also increase the stiffness of the device 10 providing further improvement of its mechanical stability. The walls 14 are arranged to lie between the pixels of the liquid crystal device so as not to disrupt any of the pixels. While the walls 14 may be arranged at a spacing of just one pixel the walls may be spaced further apart while still providing the improved mechanical stability in accordance with the invention. A spacing of approximately 200 $\mu$m has been found to provide good results and this will generally correspond to three or four pixel widths in a large area array device.

However, the arrangement of walls 14 shown in FIGS. 1 and 2 restrict the flow and shear of the liquid crystal material in substantially one direction only. In order to improve the mechanical stability of the device still further it is advantageous to restrict the flow and shear of the liquid crystal material in the orthogonal direction as well. FIG. 3 shows a small part of a liquid crystal device providing this feature in perspective view. It will be understood that such a device may not be filled with liquid crystal material as readily as that shown in FIGS. 1 and 2. Accordingly, the device is shown with the second substrate 16 suspended above a wall structure 30 mounted on a first substrate 12. The substrate 16 is spaced apart from the structure 30 by a plurality of spacer beads 32. The liquid crystal device may thus be filled in this state since the beads 32 provide a path for the liquid crystal material to fill the plurality of cavities defined by the structure 30. Once the liquid crystal device has been filled a force may be applied to the substrate 16 to break the beads (which are generally made of glass) and complete the construction of the device. In order to prevent the remnants of the spacer beads from affecting performance of the device it is preferable for these beads to be located away from the active area of the device. The structure 30 may define a plurality of cavities which are the same size as a pixel of the device. However, for ease of construction and filling of the device it is preferred that these cavities are made somewhat larger. For example the cavities may comprise nine pixels of the liquid crystal device in a 3×3 matrix. An alternative method of filling the device shown in FIG. 3 would be to introduce the liquid crystal material into the cavities formed by the structure 30 and then placing the substrate 16 on top of the structure 30. However, either of these construction techniques is prone to waste liquid crystal material which can substantially increase cost of production of the device.

FIG. 4 shows a plan view of an alternative wall structure in accordance with the present invention. The walls are of a zigzag shape or triangular wave in plan view. This structure provides restriction of the liquid crystal material in two orthogonal directions while being easier to manufacture than the device shown in FIG. 3. The walls 40 in FIG. 4 may conveniently extend from one edge of an array device to another edge of the array device which facilitates the introduction of liquid crystal material. If it is imagined that a large area liquid crystal device having walls 40 therein is provided with both substrates fitted to the walls then the liquid crystal material can be introduced using a known capillary filling technique. The wavelength, λ of the triangular waveform in which the walls are shaped will typically be related to the height of the waveform (h) and the separation between adjacent partitions (g) as follows:

$$\lambda = 2h = 2g = 1 mm.$$

The rubbing direction of the alignment layers of a device including such walls would be substantially along the length of the triangular waveforms. This will be discussed in greater detail with reference to FIG. 8 below.

FIG. 5 shows a plan view of a further wall structure in accordance with the invention. This structure is a variation on that shown in FIG. 4 wherein the ascending and descending portions of the triangular wave are not equal in height and the angle between them, θ, is not necessarily equal to 90°. In this example the ascending portion a of the wave is longer than the descending portion b. At larger values of θ the liquid crystal device may be filled more readily since the zigzag nature of the wall structure provides less restriction on the flow of the liquid crystal material. However, as θ becomes close to 180° the structure shown in FIG. 5 approximates to that shown in FIGS. 1 and 2 which provides restriction of the flow of liquid crystal material in one direction only. By altering the value of θ therefore, a trade-off is obtained between the ease of manufacture of the device and the restriction of flow of the liquid crystal material. The rubbing direction of the alignment layer for a device containing walls as shown in FIG. 5 should be along the length of the longer portion of the sawtooth waveform (in this case the ascending portion a).

FIG. 6 shows a plan view of a still further wall structure in accordance with the invention. The wall structure comprises a plurality of walls defining square-wave shapes in plan view. Only two walls are shown in the figure. The alignment direction will be along the length of the waveforms. Where the spacing between adjacent walls is very small, this arrangement comes very close to that embodiment of the invention described with reference to FIG. 3. In common with the other described embodiments this wall structure provides a trade-off between the speed of filling of the device (along the length of the waveform of the partition) against restriction of liquid crystal material flow and shear. Very close spacing provides good restriction of the flow and shear of the liquid crystal material but comparatively slow filling during manufacture and vice versa.

The abrupt changes in direction of the wall structures described so far contributes to relatively slow filling of the devices during manufacture. FIG. 7 shows a wall structure comprising a plurality of walls based on sinusoidal waveforms which clearly has no sharp edges. This makes filling of the device easier and permits the gap g between adjacent partitions to be small, typically between 100 and 200 μm. The filling direction and most appropriate alignment direction are along the length of the waveform in this embodiment.

The material from which the wall structures are constructed will not, in general, alter with the voltage applied. Accordingly it is preferable that the wall structure does not impinge on the area of any of the pixels of the device. This is particularly important as the thickness of the wall structures is increased. It will be understood that the embodiments shown in FIGS. 1 to 3 can readily be arranged to comply with this restriction. The walls 14 and wall structure 30 shown in these figures may be arranged straightforwardly to coincide with the gaps between cells of an array device. FIG. 8 shows how a wall structure based on triangular waveforms may also be arranged to coincide with gaps between pixels. The figure shows a plan view of a triangle shaped waveform wall structure with the locations of pixels shown in broken lines in the left-hand portion of the figure. In this slightly exaggerated example the gap g between adjacent waveforms is equal to the diagonal of one cell C. The rubbing direction is along the length of the waveforms as shown by the double-headed arrow RD. The filling direction also coincides with RD. This has the effect that the alignment direction of the liquid crystal molecules is not parallel to either of the edges of the pixel. The polarizers (not shown) of a device constructed with such walls will need to be aligned accordingly. The polarization direction will not be parallel to either the length or the width of the array but this has no ill effects on device performance.

FIG. 9 shows another embodiment of the present invention in which a plurality of walls 50 are provided in a first direction and a plurality of walls 52 are provided in a second direction. The length of these walls is comparatively small, being only a few pixel lengths. The arrangement may be thought of as two interlocking square waveforms at right angles to one another. Only that portion of the waveforms which would appear parallel to the time axis is provided so each waveform has only two states without any wall attaching them. A suitable pixel layout for use with this wall structure is shown in broken lines on the left-hand side of FIG. 9. It will be seen that the length of each wall 50, 52 is equal to the width of two liquid crystal pixels. The walls 50, 52 may be provided at a greater length than that shown here, for example having a length of 5 to 10 liquid crystal pixels, without sacrificing the advances of the present invention. The rubbing direction of a liquid crystal device provided with such walls may be parallel to either the walls 50 or the walls 52. Because of the open structure of this wall arrangement the device may be readily filled along the alignment direction.

FIGS. 10 to 12 show plan views of three further wall structures in accordance with the present invention. The three structures are based on triangle waves, square waves and sine waves respectively but alternate walls are arranged to face in opposite directions, in other words, every other wall is in an opposite orientation to its two nearest neighbours. As can be seen from the Figures this creates a bottle-neck effect when the display device is filled with liquid crystal material. In the three examples shown here the rubbing and filling directions will be along the length of the waveforms.

FIG. 13 shows a plan view of a still further wall structure in accordance with the present invention. The structure comprises a plurality of long, straight walls 60 substantially parallel to one another (of which two are shown) and a plurality of small extension portions 62 extending from each wall 60. The rubbing and filling directions are substantially parallel to the walls 60. It can be seen that this arrangement will provide both fast filling of the device during manufacture and also good resistance to flow and shear of the liquid crystal in use. By shortening or lengthening the extendible wall portions 62, greater or lesser restriction of flow is available with the consequent, and inverted, effects on filling speed. The arrangement of walls shown in FIG. 13 can readily be arranged to lie between pixels in a liquid crystal device array with each substantially square portion of the structure corresponding to, for example, 4, 9 or 16 pixels.

The discussion of the present invention has concentrated thus far on the arrangement of wall structures in plan view. It will cause deterioration in the performance of the present invention if the walls do not extend fully, or very nearly so, between the substrates of the liquid crystal device. FIG. 14 shows elevational views of the walls in accordance with the present invention. FIG. 14(a) shows a wall structure 70 formed on the substrate 12 of a liquid crystal device. When the substrate 16 is fitted to the device, the restriction of liquid crystal material will rely upon the accuracy with which the height of the wall 70 is provided during manufacture. FIG. 15 and its associated description will cover a suitable manufacturing method whose tolerances are suitable for this purpose.

FIG. 14(b) shows a wall 72 of thickness t provided on the substrate 12 and a pair of somewhat shorter walls 74, 76 provided on the substrate 16. Upon assembly of the liquid crystal device the wall 72 will fit snugly between the walls 74 and 76 to provide some resistance to any manufacturing tolerances in the height of the wall 72. In addition to providing a liquid-tight barrier between the two substrates this arrangement will also restrict the movement of the substrate 16 with respect of the substrate 12 reducing the risk of shear. Since movement of the substrates relative to each other may result in defects being formed within the liquid crystal material this is advantageous. However, a disadvantage of this arrangement is that the wall structure has the width of the three walls 74, 72 and 76. It may prove difficult to arrange three wall thicknesses between the cells of the liquid crystal device without disrupting the quality of the display. To overcome this an alternative arrangement is shown at FIG. 14(c). In this embodiment the substrate 12 has a plurality of walls mounted thereon of which two are shown 84, 86. The walls 84, 86 extend most of the way towards the substrate 16. Similarly, the substrate 16 is provided with a plurality of walls of which two are shown at 80, 82. As can be seen from the Figure the walls 80 and 82 are arranged slightly closer together than the walls 84 and 86. When the liquid crystal device is assembled the walls 80, 82 fit snugly between the walls 84, 86 which not only provides a liquid crystal-tight chamber to restrict liquid crystal flow but also prevents movement of the substrate 16 relative to the substrate 12 in at least one direction. This further enhances the mechanical stability of the device.

FIG. 15 shows diagrams corresponding to two additional steps in the manufacture of a liquid crystal device in accordance with the present invention. FIG. 15(a) shows a production step to be performed after the substrate has been provided with electrode structures and a rubbed alignment layer. The substrate 12 is arranged to rotate at high speed while a solvent and monomer mixture is spun-down onto the surface thereof.

This process is analogous to that which is used to provide the alignment layer on the substrate except that the layer of monomer to be spun down will be somewhat thicker. For a wall structure as shown in FIG. 14(a) the layer will need to be the same thickness as the liquid crystal in the completed device, typically 1500 nm. Once the layer is spun down the monomer is polymerized using known techniques, for example ultraviolet irradiation. Thus a layer of polymer 90 is provided on top of the substrate 12 as shown in FIG. 15(b). Then a mask 92 of any suitable material is provided on top of the layer 90 and the layer 90 is etched, for example by wet etching, to provide the plurality of walls on the substrate 12 (indicated in broken lines). Alternatively, the manufacturing steps may be rearranged in order to form the alignment layer after the walls. This has the advantage that the etching step which forms the walls has no risk of damaging the alignment layer.

Where one of the wall structures shown in FIG. 14(b) or FIG. 14(c) is required, the other substrate 16 (not shown in FIG. 15) is also treated using these production steps to provide the appropriate wall structure on that other substrate. The layer of monomer to be spun down will be rather thinner to provide the short walls 74, 76 required for the embodiment shown in FIG. 14(b). It will be understood that the shape of the mask 92 will correspond with the shape of the wall structure required as shown in any of the FIGS. 1 to 13.

The scope of the present invention also encompasses any modifications and improvements which will occur to a person skilled in the art on reading the present specification.

What is claimed is:

1. A method of filling a liquid crystal device comprising a liquid crystal material contained between two substrates, the substrates having faces carrying electrode structures for addressing a plurality of liquid crystal cells, and a wall structure extending between the two substrates for restricting flow of the liquid crystal material in at least one direction substantially parallel to the faces of the substrates, the method comprising temporarily holding the substrates apart by means of spacer members, introducing liquid crystal material into a plurality of cavities defined by the wall structure, and compressing the substrates so as to cause the spacer members to yield structurally in order to bring the substrates and the wall structure together.

2. A method as claimed in claim 1, wherein the spacer members are glass beads adapted to be broken in order to bring the substrates and the wall structure together.

3. A method as claimed in claim 1, wherein the wall structure is a regular lattice which forms closed cavities for liquid crystal material when sandwiched between the substrates.

4. A method as claimed in claim 1, wherein the electrode structures define active areas of the device, and the spacer members are located outside these active areas.

5. A method as claimed in claim 1, wherein the device is a ferroelectric liquid crystal display device.

* * * * *